(12) United States Patent
Zhou

(10) Patent No.: US 11,019,642 B2
(45) Date of Patent: May 25, 2021

(54) METHOD AND APPARATUS FOR DATA TRANSMISSION, USER EQUIPMENT AND BASE STATION

(71) Applicant: BEIJING XIAOMI MOBILE SOFTWARE CO., LTD., Beijing (CN)

(72) Inventor: Juejia Zhou, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/624,296

(22) PCT Filed: Jun. 23, 2017

(86) PCT No.: PCT/CN2017/089725
§ 371 (c)(1),
(2) Date: Dec. 19, 2019

(87) PCT Pub. No.: WO2018/232726
PCT Pub. Date: Dec. 27, 2018

(65) Prior Publication Data
US 2020/0178270 A1    Jun. 4, 2020

(51) Int. Cl.
*H04W 4/00* (2018.01)
*H04W 72/12* (2009.01)
*H04L 1/18* (2006.01)
*H04W 28/04* (2009.01)

(52) U.S. Cl.
CPC ....... *H04W 72/1242* (2013.01); *H04L 1/1812* (2013.01); *H04W 28/04* (2013.01); *H04W 72/1273* (2013.01); *H04W 72/1289* (2013.01)

(58) Field of Classification Search
USPC .......................... 370/330, 280, 328, 329, 252
See application file for complete search history.

(56) References Cited

U.S. PATENT DOCUMENTS

2011/0134774 A1* 6/2011 Pelletier ................. H04L 5/001
370/252
2013/0077583 A1* 3/2013 Kim .................... H04W 72/048
370/329
(Continued)

FOREIGN PATENT DOCUMENTS

CN    105323049 A    2/2016
CN    105472663 A    4/2016
(Continued)

OTHER PUBLICATIONS

European Patent Office, Extended European Search Report Issued in Application No. 17915143.6, dated May 20, 2020, Germany, 10 pages.
(Continued)

*Primary Examiner* — David Q Nguyen
(74) *Attorney, Agent, or Firm* — Syncoda LLC; Feng Ma

(57) ABSTRACT

A method of data transmission includes: a transmission of service data sent by a base station is received, where scheduling control data on the transmission of the service data carries scheduling information of service data for which a transmission resource is preempted; and the service data for which the transmission resource is preempted is received according to the scheduling information. According to examples of the present disclosure, the service data for which the transmission resource is preempted is received according to the scheduling information carried in the scheduling control data on the received transmission of the service data, thereby implementing transmission of the service data for which the transmission resource is preempted.

7 Claims, 8 Drawing Sheets

Receive a transmission of service data sent by a base station, where scheduling control data on the transmission of the service data carries scheduling information of service data for which a transmission resource is preempted    S101

Receive the service data for which the transmission resource is preempted according to the scheduling information    S102

(56) References Cited

U.S. PATENT DOCUMENTS

| | | | |
|---|---|---|---|
| 2016/0007320 A1 | 1/2016 | Wang et al. | |
| 2016/0174259 A1 | 6/2016 | Mukherjee et al. | |
| 2017/0150367 A1 | 5/2017 | Han et al. | |
| 2017/0303144 A1* | 10/2017 | Guo | H04W 74/0808 |
| 2017/0332397 A1* | 11/2017 | Li | H04L 1/1887 |
| 2018/0027493 A1* | 1/2018 | Li | H04W 52/0216 370/280 |
| 2018/0041325 A1* | 2/2018 | Lee | H04L 1/00 |
| 2018/0352570 A1* | 12/2018 | Sun | H04W 72/1289 |
| 2018/0359751 A1* | 12/2018 | Ko | H04L 5/0053 |
| 2018/0368113 A1* | 12/2018 | Gupta | H04W 72/042 |
| 2019/0349960 A1* | 11/2019 | Li | H04W 72/1242 |
| 2020/0008216 A1* | 1/2020 | Iyer | H04W 72/04 |
| 2020/0037254 A1* | 1/2020 | Comsa | H04W 52/365 |
| 2020/0170032 A1* | 5/2020 | Li | H04L 1/1812 |
| 2020/0229177 A1* | 7/2020 | Zou | H04W 72/0446 |
| 2020/0275465 A1* | 8/2020 | Horiuchi | H04W 56/005 |

FOREIGN PATENT DOCUMENTS

| | | |
|---|---|---|
| CN | 106304385 A | 1/2017 |
| CN | 106664569 A | 5/2017 |
| WO | 2011066333 A1 | 6/2011 |

OTHER PUBLICATIONS

InterDigital, Inc., "HARQ Feedback design considerations for CBG based transmission", 3GPP TSG RAN WG1 NR Ad-Hoc#2, Qingdao, P.R. China, R1-1710954, Jun. 27-30, 2017, 3 pages.

NTT Docomo, Inc., "CBG based (re) transmission, preemption indication and subsequent trasnmission in NR", 3GPP TSG RAN WG1 Meeting #89, Hangzhou, P.R. China, R1-1708384, May 15-19, 2017, 8 pages.

Huawei, HiSilicon, "Superposed transmission of pre-emption indication with eMBB data", 3GPP TSG RAN WG1 NR Ad-Hoc Meeting , Qingdao, China, R1-1711428, Jun. 27-30, 2017, 4 pages.

ISA State Intellectual Property Office of the People's Republic of China, Written Opinion of the International Searching Authority Issued in Application No. PCT/CN2017/089725, dated Mar. 21, 2018, WIPO, 8 pages.

ISA State Intellectual Property Office of the People's Republic of China, International Search Report Issued in Application No. PCT/CN2017/089725, dated Mar. 21, 2018, WIPO, 6 pages.

Convida Wireless, "Discussion on DL Preemption Indication", R1-1709059. 3GPP TSG RAN WG1 Meeting #89, May 6, 2017, sections 1 and 2, 4 pages.

Huawei et al. "On DL Multiplexing of URLLC and EMBB Transmissions", R1-1704216. 3GPP TSG RAN WG1 Meeting #88bis, Mar. 25, 2017, section 3, 8pages.

LG Electronics. "Discussion on CBG-Based Retransmission for Pre-emption Recovery", R1-1707663. 3GPP TSG RAN WG1 Meeting #89, May 6, 2017, section 3, 4 pages.

LG Electronics. Discussion on Pre-emption Indication Design, R1-1707664. 3GPP TSG RAN WG1 Meeting #89, May 6, 2017, sections 2-4, 5 pages.

State Intellectual Property Office of the Peoples Republic of China, Office Action and Search Report Issued in Application No. 2017800006635, dated Apr. 1, 2021, 28 pages, (Submitted with Machine Translation).

* cited by examiner

METHOD AND APPARATUS FOR DATA TRANSMISSION, USER EQUIPMENT AND BASE STATION

CROSS-REFERENCE TO RELATED APPLICATION

This application is a national stage of International Application No. PCT/CN2017/089725 filed on Jun. 23, 2017, the disclosure of which is hereby incorporated by reference in its entirety.

TECHNICAL FIELD

The present disclosure relates to the field of communication technology, and in particular, to a method and an apparatus for data transmission, user equipment, a base station and a computer-readable storage medium.

BACKGROUND

With the development of communication technology, $5^{th}$ Generation (5G) of mobile communication technology has emerged. Current service types of the 5G include at least enhanced Mobile Broad Band (eMBB), massive Machine Type Communication (mMTC), Ultra Reliable Low Latency Communication (URLLC) and the like. Though all these services are all data services, requirements for latency and reliability are different. For example, the URLLC service used in areas such as internet of vehicle that require low latency makes a high demand for timeliness, needs to be established timely, and may even be preemptive for prior services. The mMTC service is usually not sensitive to latency and data can be sent at long intervals. One way to achieve efficient transmission of latency-sensitive services is to improve transmission of Hybrid Automatic Repeat reQuest (HARQ) by, for example, making retransmission feedback faster and more accurate.

In Long-Term Evolution (LTE), HARQ feedback is performed in units of Transmission Blocks (TBs), and each TB feeds back a 1-bit acknowledgement (ACK) or non-acknowledgement (NACK) message. In order to improve accuracy of retransmission, the $3^{rd}$ Generation Partnership Project (3GPP) proposes retransmission on the basis of Code Block Group (CBG). The CBG is a smaller unit of data in TB and one CBG corresponds to 1 bit of ACK or NACK feedback. Due to a smaller retransmission granularity, position of erroneous transmission can be more accurately reflected, thereby making retransmission more accurate. Due to a smaller amount of data to be retransmitted, the efficiency of retransmission is higher.

However, if a service preemption occurs, for example, in case where a URLLC service approaches when an eMBB service has started transmitting or is about to start transmitting, URLLC will preempt the transmission time-frequency resources of eMBB. The preempted eMBB data is still to be transmitted. How to transmit the preempted eMBB data is a technical problem to be solved.

SUMMARY

In view of this, the present application discloses a method and an apparatus for data transmission, user equipment, a base station and a computer-readable storage medium to transmit service data for which a transmission resource is preempted.

According to a first aspect of examples of the present disclosure, there is provided a method of data transmission, and the method includes:

receiving a transmission of service data sent by a base station, where scheduling control data on the transmission of the service data carries scheduling information of service data for which a transmission resource is preempted; and receiving the service data for which the transmission resource is preempted according to the scheduling information.

In an example, receiving the transmission of the service data sent by the base station includes:

receiving one transmission of first service data sent by the base station, where scheduling control data on the transmission of the first service data carries scheduling information indicating a transmission resource location of the first service data which is preempted by second service data and the first service data corresponding to the transmission resource location; and receiving the service data for which the transmission resource is preempted according to the scheduling information includes:

receiving the first service data corresponding to the transmission resource location according to the scheduling information.

In an example, receiving the transmission of the service data sent by the base station includes:

receiving a transmission of second service data sent by the base station, where scheduling control data on the transmission of the second service data carries scheduling information indicating a transmission resource location of the first service data which is preempted by the second service data and the first service data corresponding to the transmission resource location; and receiving the service data for which the transmission resource is preempted according to the scheduling information includes:

receiving the first service data corresponding to the transmission resource location according to the scheduling information.

In an example, receiving the transmission of the service data sent by the base station includes:

receiving two transmissions of first service data sent by the base station, where scheduling control data on the latter transmission of the two transmissions of the first service data carries scheduling information indicating a transmission resource location of the first service data which is preempted by second service data in the former transmission of the two transmissions of the first service data and the first service data corresponding to the transmission resource location; and receiving the service data for which the transmission resource is preempted according to the scheduling information includes:

receiving the first service data corresponding to the transmission resource location according to the scheduling information.

In an example, upon receiving the first service data corresponding to the transmission resource location according to the scheduling information, the method further includes:

sending simultaneously, to the base station, HARQ feedback information associated with the first service data corresponding to the transmission resource location and HARQ feedback information associated with other first service data than the first service data of the transmission through which the first service data is transmitted; or sending separately, to the base station, the HARQ feedback information associated with the first service data corresponding to the transmission resource location and the HARQ feedback information associated with the other first service data than the first service data of the transmission through which the first service data is transmitted.

According to a second aspect of the examples of the present disclosure, there is provided a method of data transmission, and the method includes:

determining that there is service data for which a transmission resource is preempted; and sending a transmission of the service data to User Equipment (UE), where scheduling control data on the transmission of the service data carries scheduling information of the service data for which the transmission resource is preempted, so that the UE receives the service data for which the transmission resource is preempted according to the scheduling information.

In an example, determining that there is the service data for which the transmission resource is preempted includes:

judging that second service data preempts a transmission resource for first service data; or detecting that the second service data preempts the transmission resource for the first service data.

In an example, sending the transmission of the service data to the UE includes:

sending one transmission of first service data to the UE, where scheduling control data on the transmission of the first service data carries scheduling information indicating a transmission resource location of the first service data which is preempted by second service data and the first service data corresponding to the transmission resource location, so that the UE receives the first service data corresponding to the transmission resource location according to the scheduling information.

In an example, sending the transmission of the service data to the UE includes:

sending a transmission of second service data to the UE, where scheduling control data on the transmission of the second service data carries scheduling information indicating a transmission resource location of the first service data which is preempted by the second service data and the first service data corresponding to the transmission resource location, so that the UE receives the first service data corresponding to the transmission resource location according to the scheduling information.

In an example, sending the transmission of the service data to the UE includes:

sending two transmissions of first service data to the UE, where scheduling control data for the latter transmission of the two transmissions of the first service data carries scheduling information indicating a transmission resource location of the first service data which is preempted by second service data in the former transmission of the two transmissions of the first service data and the first service data corresponding to the transmission resource location, so that the UE receives the first service data corresponding to the transmission resource location according to the scheduling information transmission of the first service data.

In an example, the method further includes:

upon sending the transmission of the service data to the UE, receiving HARQ feedback information associated with the first service data corresponding to the transmission resource location and HARQ feedback information associated with other first service data than the first service data of the transmission through which the first service data is transmitted, sent simultaneously or separately by the UE.

According to a third aspect of the examples of the present disclosure, there is provided an apparatus for data transmission, and the apparatus includes:

a first receiving module configured to receive a transmission of service data sent by a base station, where scheduling control data on the transmission of the service data carries scheduling information of service data for which a transmission resource is preempted; and a second receiving module configured to receive data for which the transmission resource is preempted according to the scheduling information, which is carried by the scheduling control data on the transmission of the service data received by the first receiving module.

In an example, the first receiving module includes:

a first receiving sub-module configured to receive one transmission of first service data sent by the base station, where scheduling control data on the transmission of the first service data carries scheduling information indicating a transmission resource location of the first service data which is preempted by second service data and the first service data corresponding to the transmission resource location; and the second receiving module includes:

a second receiving sub-module configured to receive the first service data corresponding to the transmission resource location according to the scheduling information.

In an example, the first receiving module includes:

a third receiving sub-module configured to receive a transmission of second service data sent by the base station, where scheduling control data on the transmission of the second service data carries scheduling information indicating a transmission resource location of the first service data which is preempted by the second service data and the first service data corresponding to the transmission resource location; and the second receiving module includes:

a fourth receiving sub-module configured to receive the first service data corresponding to the transmission resource location according to the scheduling information.

In an example, the first receiving module includes:

a fifth receiving sub-module configured to receive two transmissions of first service data sent by the base station, where scheduling control data on the latter transmission of the two transmissions of the first service data carries scheduling information indicating a transmission resource location of the first service data which is preempted by second service data in the former transmission of the two transmissions of the first service data and the first service data corresponding to the transmission resource location; and the second receiving module includes:

a sixth receiving sub-module configured to receive the first service data corresponding to the transmission resource location according to the scheduling information.

In an example, the apparatus further includes:

a first sending module configured to, upon receiving the first service data corresponding to the transmission resource location according to the scheduling information by the second receiving module, send simultaneously, to the base station, HARQ feedback information associated with the first service data corresponding to the transmission resource location and HARQ feedback information associated with other first service data than the first service data of the transmission through which the first service data is transmitted; or a second sending module configured to, upon receiving the first service data corresponding to the transmission resource location according to the scheduling information by the second receiving module, send separately, to the base station, the HARQ feedback information associated with the first service data corresponding to the transmission resource location and the HARQ feedback information associated with the other first service data than the first service data of the transmission through which the first service data is transmitted.

According to a fourth aspect of the examples of the present disclosure, there is provided an apparatus for data transmission, and the apparatus includes:

a determining module configured to determine that there is service data for which a transmission resource is preempted; and a sending module configured to, upon determining that there is the service data for which the transmission resource is preempted by the determining module, send a transmission of the service data to UE, where scheduling control data on the transmission of the service data carries scheduling information of the service data for which the transmission resource is preempted, so that the UE receives the service data for which the transmission resource is preempted according to the scheduling information.

In an example, the determining module includes:

a first determining sub-module configured to judge that second service data preempts a transmission resource for first service data; or a second determining sub-module configured to detect that the second service data preempts the transmission resource for the first service data.

In an example, the sending module includes:

a first sending sub-module configured to send one transmission of first service data to the UE, where scheduling control data on the transmission of the first service data carries scheduling information indicating a transmission resource location of the first service data which is preempted by second service data and the first service data corresponding to the transmission resource location, so that the UE receives the first service data corresponding to the transmission resource location according to the scheduling information.

In an example, the sending module includes:

a second sending sub-module configured to send a transmission of second service data to the UE, where scheduling control data on the transmission of the second service data carries scheduling information indicating a transmission resource location of the first service data which is preempted by the second service data and the first service data corresponding to the transmission resource location, so that the UE receives the first service data corresponding to the transmission resource location according to the scheduling information.

In an example, the sending module includes:

a third sending sub-module configured to send two transmissions of first service data to the UE, where scheduling control data on the latter transmission of the two transmissions of the first service data carries scheduling information indicating a transmission resource location of the first service data which is preempted by second service data in the former transmission of the two transmissions of the first service data and the first service data corresponding to the transmission resource location, so that the UE receives the first service data corresponding to the transmission resource location according to the scheduling information.

In an example, the apparatus further includes:

a receiving module configured to, upon sending transmission of the service data to the UE by the sending module, receive HARQ feedback information associated with the first service data corresponding to the transmission resource location and HARQ feedback information associated with other first service data than the first service data of the transmission through which the first service data is transmitted, sent simultaneously or separately by the UE.

According to a fifth aspect of the examples of the present disclosure, there is provided user equipment, including:

a processor; and a memory for storing instructions executable by the processor, where the processor is configured to:

receive a transmission of service data sent by a base station, where scheduling control data for the transmission of the service data carries scheduling information of the service data for which a transmission resource is preempted; and receive the service data for which the transmission resource is preempted according to the scheduling information.

According to a sixth aspect of the examples of the present disclosure, there is provided a base station, including:

a processor; and a memory for storing instructions executable by the processor, where the processor is configured to:

determine that there is service data for which a transmission resource is preempted; and send a transmission of the service data to UE, where scheduling control data on the transmission of the service data carries scheduling information of the service data for which the transmission resource is preempted, so that the UE receives the service data for which the transmission resource is preempted according to the scheduling information.

According to a seventh aspect of the examples of the present disclosure, there is provided a computer readable storage medium having a computer program stored thereon, where the program is executed by a processor to perform steps of a data transmission method as described above.

According to an eighth aspect of the examples of the present disclosure, there is provided a computer-readable storage medium storing a computer program that, when executed by a processor, causes the processor to implement the method of data transmission as described above.

The technical solutions provided by the examples of the present disclosure may include the following beneficial effects.

The service data for which the transmission resource is preempted is received according to the scheduling information carried in the scheduling control data on the received transmission of the service data, thereby realizing the transmission of the service data for which the transmission resource is preempted.

The scheduling information indicating a transmission resource location of the first service data which is preempted by the second service data and the first service data corresponding to the transmission resource location carried in the scheduling control data on the transmission of the first service data is received. The first service data corresponding to the transmission resource location is received according to the scheduling information, that is, the service data for which the transmission resource is preempted is received. In this way, the transmission of the service data for which the transmission resource is preempted is realized.

The scheduling information indicating a transmission resource location of the first service data which is preempted by the second service data and the first service data corresponding to the transmission resource location carried in the scheduling control data on the transmission of the second service data is received. The first service data corresponding to the transmission resource location is received according to the scheduling information, that is, the service data for which the transmission resource is preempted is received. In this way, the transmission of the service data for which the transmission resource is preempted is realized.

The scheduling information indicating a transmission resource location of the first service data which is preempted by the second service data in the former transmission of the two transmissions of the first service data and the first service data corresponding to the transmission resource location, carried in the scheduling control data on the latter transmission of the two transmissions of the first service data is received. The first service data corresponding to the transmission resource location is received according to the scheduling information, that is, the service data for which the transmission resource is preempted is received. In this way, the transmission of the service data for which the transmission resource is preempted is realized.

The HARQ feedback information associated with the first service data corresponding to the transmission resource location and the HARQ feedback information associated with the other first service data than the first service data of the transmission through which the first service data is transmitted are sent to the base station simultaneously or separately, thereby sending the HARQ feedback information to the base station in various ways.

Upon that there is service data for which a transmission resource is preempted, the transmission of the service data is sent to the UE, so that the UE receives the service data for which the transmission resource is preempted according to the scheduling information carried in the scheduling control data on the transmission of the service data.

It may determine that there is the service data for which the transmission resource is preempted in many ways, and the implementation manners thereof are flexible and diverse.

One transmission of the first service data is sent to the UE, so that the UE can receive the first service data corresponding to the transmission resource location according to the received scheduling control data, where the scheduling control data on the transmission of the first service data carries scheduling information indicating a transmission resource location of the first service data which is preempted by second service data and the first service data corresponding to the transmission resource location. The first service data corresponding to the transmission resource location is the service data for which the transmission resource is preempted. Thus, the transmission of the service data for which the transmission resource is preempted is realized.

The transmission of the second service data is sent to the UE, so that the UE can receive the first service data corresponding to the transmission resource location according to the scheduling control data, where the scheduling control data on the transmission of the second service data carries the scheduling information indicating a transmission resource location of the first service data which is preempted by the second service data and the first service data corresponding to the transmission resource location. The first service data corresponding to the transmission resource location is the service data for which the transmission resource is preempted. Thus, the transmission of the service data for which the transmission resource is preempted is realized.

Two transmissions of the first service data are sent to the UE, so that the UE can receive the first service data corresponding to the transmission resource location according to the scheduling control data on the latter transmission of the two transmissions of the first service data, where the scheduling control data carries the scheduling information indicating a transmission resource location of the first service data which is preempted by the second service data in the former transmission of the two transmissions of the first service data and the first service data corresponding to the transmission resource location. The first service data corresponding to the transmission resource location is the service data for which the transmission resource is preempted. Thus, the transmission of the service data for which the transmission resource is preempted is realized.

By receiving HARQ feedback information associated with the first service data corresponding to the transmission resource location and HARQ feedback information associated with other first service data than the first service data of the transmission through which the first service data is transmitted, sent simultaneously or separately by the UE, first service data which fails to be sent may be determined according to the HARQ feedback information, so as to provide a condition for re-transmitting the first service data which fails to be sent.

It should be understood that the above general description and the following detailed description are only exemplary and explanatory and are not restrictive of the present disclosure.

BRIEF DESCRIPTION OF THE DRAWINGS

The accompanying drawings, incorporated in and constitute part of the specification, illustrate the examples of the present disclosure, and serve to explain the principles of the present disclosure in conjunction with the specification.

DETAILED DESCRIPTION

Figure 1:
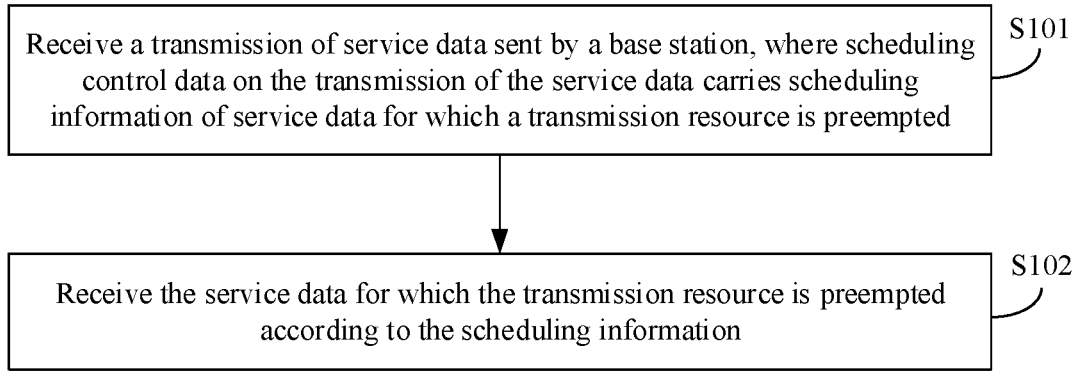
FIG. 1 is a flowchart illustrating a method of data transmission according to an example of the present application.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

FIG. 1 is a flowchart illustrating a method of data transmission according to an example of the present application. This example is described from a User equipment (UE) side. As shown in FIG. 1, the method of data transmission includes the followings.

At step S101, a transmission of service data sent by a base station is received, where scheduling control data on the transmission of the service data carries scheduling information of service data for which a transmission resource is preempted.

In this example, receiving the transmission of the service data sent by the base station may include, but is not limited to, any of the followings.

1) one transmission of first service data sent by the base station is received, and scheduling control data on the transmission of the first service data carries scheduling information indicating a transmission resource location where second service data preempts first service data and scheduling information of first service data corresponding to the transmission resource location.

The first service data may include, but is not limited to, eMBB data, and the second service data may include, but is not limited to, URLLC data.

For example, when the base station can predict a transmission resource for the eMBB data which is preempted by the URLLC data, scheduling control data on the transmission for the eMBB data may carry scheduling information indicating a transmission resource location of the eMBB data which is preempted by the URLLC data and the eMBB data corresponding to the transmission resource location. The scheduling control data may be carried on a Physical Downlink Control Channel (PDCCH).

2) A transmission of second service data sent by the base station is received, and scheduling control data on the transmission of the second service data carries scheduling information indicating a transmission resource location where second service data preempts first service data and scheduling information of first service data corresponding to the transmission resource location.

The first service data may include, but is not limited to, eMBB data, and the second service data may include, but is not limited to, URLLC data.

For example, when the base station cannot predict a transmission resource for the eMBB data which is preempted by the URLLC data, that is, a PDCCH associated with the eMBB data does not carry scheduling information indicating a transmission resource location of the eMBB data which is preempted by the URLLC data and the eMBB data corresponding to the transmission resource position, scheduling control data associated with the URLLC data may carry scheduling information indicating a transmission resource location where the URLLC data preempts of the eMBB data and the eMBB data corresponding to the transmission resource location. The scheduling control data associated with the URLLC data may be carried on the PDCCH.

3) Two transmissions of first service data sent by the base station are received, where scheduling control data for the latter transmission of the two transmissions of the first service data carries scheduling information indicating a transmission resource location and the first service data corresponding to the transmission resource location. The transmission resource location is a transmission resource location of the first service data which is preempted by the second service data in the former transmission of the two transmissions of the first service data.

The first service data may include, but is not limited to, eMBB data, and the second service data may include, but is not limited to, URLLC data.

For example, when the base station cannot predict a transmission resource for the eMBB data which is preempted by the URLLC data, and while scheduling for the URLLC data is semi-persistent scheduling or grant free, two transmissions of the eMBB data may be sent to UE, and scheduling control data on the second time in the two times of the transmission for the eMBB data carries scheduling information indicating the transmission resource location of the eMBB data which is preempted by the URLLC data and the eMBB data corresponding to the transmission resource location in the former transmission of the two transmissions of the eMBB data. The transmission resource location indicates where the eMBB data. The scheduling control data for the latter transmission for the eMBB data may be carried on the PDCCH.

At step S102, the service data, for which the transmission resource is preempted, is received according to the scheduling information.

Because the scheduling control data carries the scheduling information of the service data for which the transmission resource is preempted, according to the scheduling information, the UE can receive first service data corresponding to the above transmission resource location, e.g., the service data for which the transmission resource is preempted, thereby, realizing the transmission of the service data, such as the eMBB data, for which the transmission resource is preempted.

In the example, the service data for which the transmission resource is preempted is received according to the scheduling information carried in the scheduling control data on the received transmission of the service data, thereby realizing the transmission of the service data for which the transmission resource is preempted.

Figure 2A:
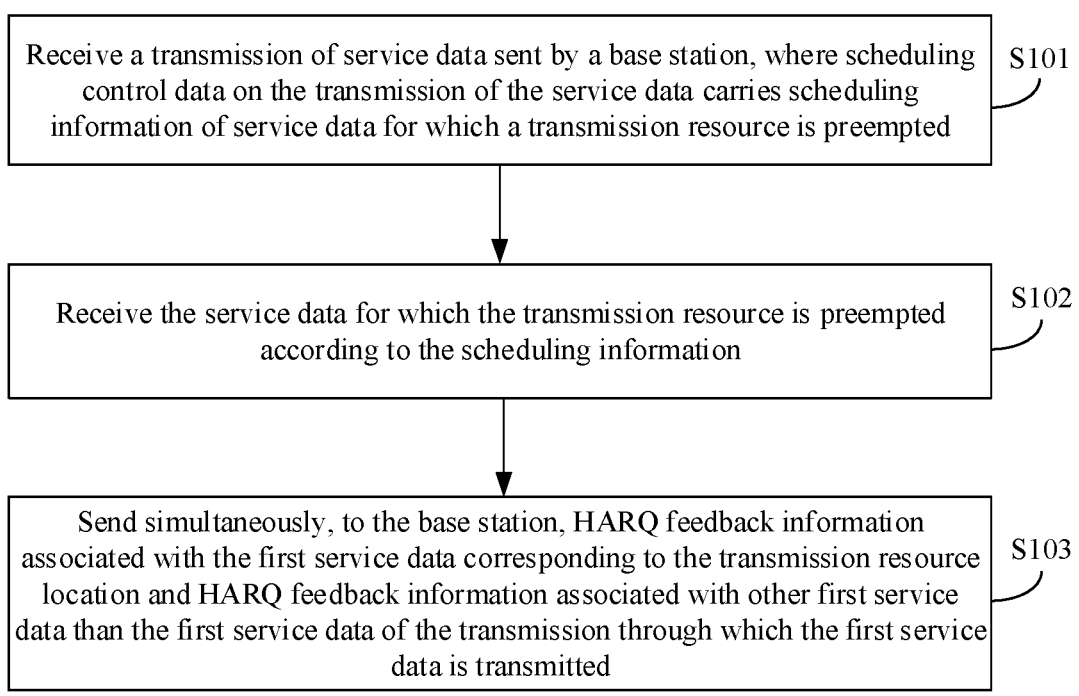
FIG. 2A is a flowchart illustrating another method of data transmission according to an example of the present application.

FIG. 2A is a flowchart illustrating another method of data transmission according to an example of the present application. As shown in FIG. 2A, after step S102, the method of data transmission may further include:

at step S103, HARQ feedback information associated with first service data corresponding to the transmission resource location and HARQ feedback information associated with other first service data than the first service data of the transmission through which the first service data is transmitted are sent to the base station simultaneously.

In this example, a time when the UE receives the first service data corresponding to the transmission resource location is later than a time when the UE receives other first service data in the same transmission of the first service data. After receiving the first service data corresponding to the transmission resource location, the UE may select to send, to the base station simultaneously, the HARQ feedback information associated with first service data corresponding to the transmission resource location and HARQ feedback information associated with other first service data than the first service data of the transmission through which the first service data is transmitted, thereby saving feedback overhead. This method may be applied to HARQ feedback with latency, and also to HARQ feedback without latency.

Figure 2B:
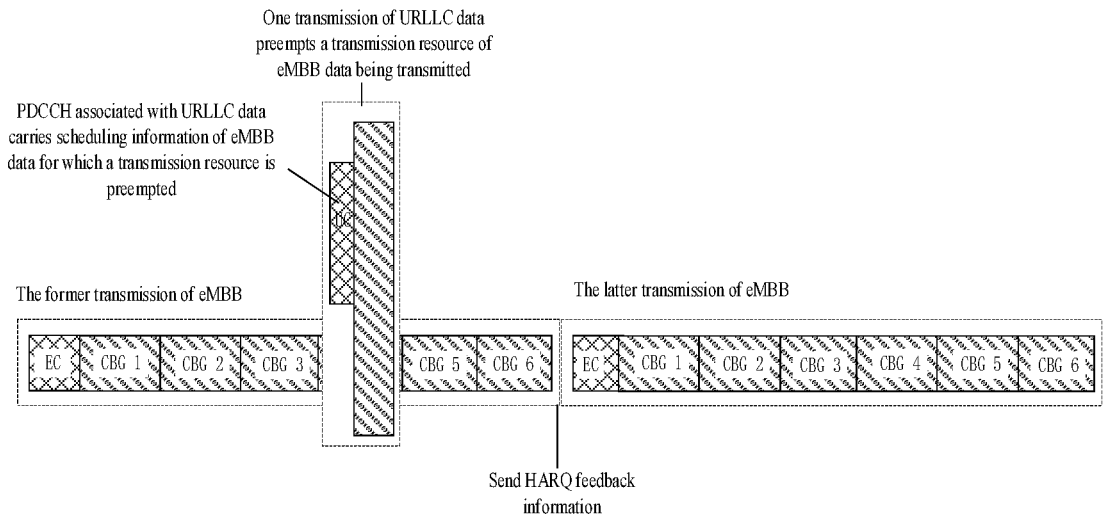
FIG. 2B is a schematic diagram illustrating HARQ feedback without latency according to an example of the present application.

For example, as for the HARQ feedback without latency, as shown in FIG. 2B, it is assumed that the PDCCH associated with URLLC data carries scheduling information indicating where a transmission resource for eMBB data is preempted, and it is assumed that the scheduling information indicates that the UE receives the eMBB data for which the transmission resource is preempted, i.e., the eMBB data corresponding to CBG 4, on a time domain resource occupied by CBG 5 and on a frequency different from that occupied by CBG5. In this way, when sending HARQ feedback information to the base station, the UE may feed back HARQ feedback information associated with the eMBB data for which the transmission resource is preempted and HARQ feedback information associated with other eMBB data in one eMBB transmission simultaneously.

Figure 3:
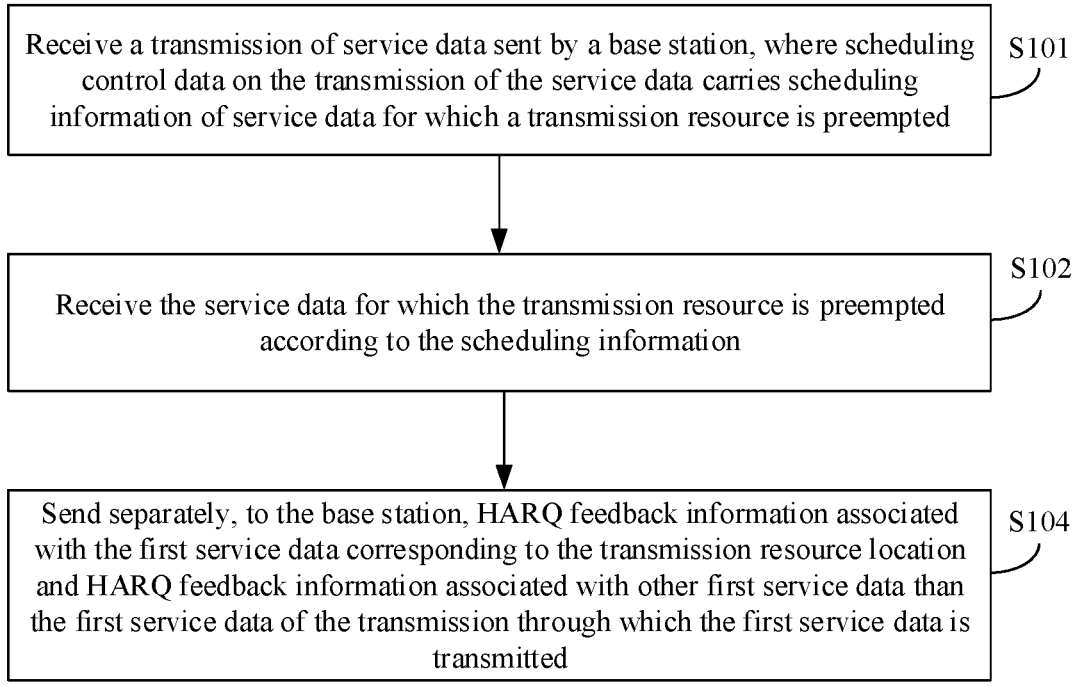
FIG. 3 is a flowchart illustrating another method of data transmission according to an example of the present application.

In addition, as shown in FIG. 3, after step S102, a method of data transmission may further include:

at step S104, HARQ feedback information associated with first service data corresponding to the transmission resource location and HARQ feedback information associated with other first service data than the first service data of the transmission through which the first service data is transmitted are sent to the base station separately.

In the example, a time when the UE receives the first service data corresponding to the transmission resource location is later than a time when the UE receives other first service data in the same transmission of the first service data. Upon receiving the first service data corresponding to the transmission resource location, the UE may select to send, to the base station separately, the HARQ feedback information associated with first service data corresponding to the transmission resource location and HARQ feedback information associated with other first service data than the first service data of the transmission through which the first service data is transmitted, such that receiving conditions associated with other first service data may be fed back to the base station in time. This method may be applied to HARQ feedback with latency, and also to HARQ feedback without latency.

In the above examples, the HARQ feedback information associated with first service data corresponding to the transmission resource location and the HARQ feedback information associated with other first service data than the first service data of the transmission through which the first service data is transmitted are sent to the base station simultaneously or separately, thereby realizing sending the HARQ feedback information to the base station in various ways.

Figure 4:
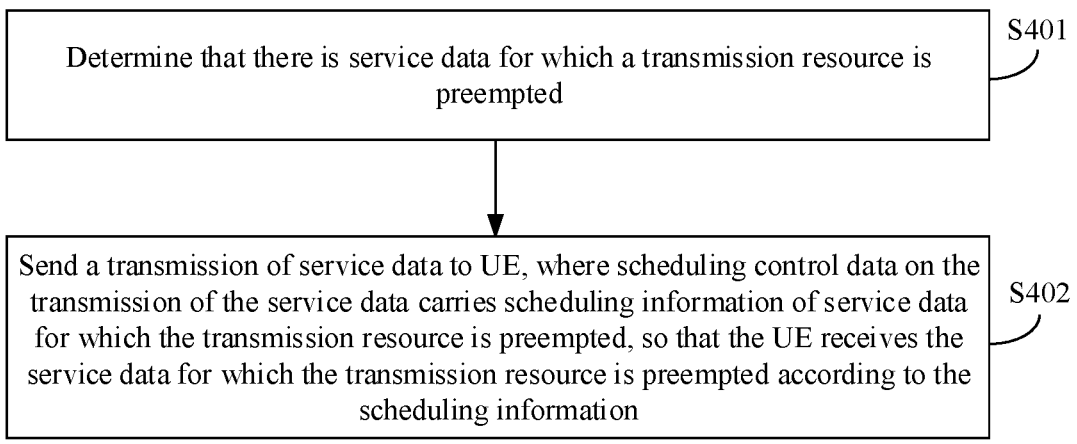
FIG. 4 is a flowchart illustrating still another method of data transmission according to an example of the present application.

FIG. 4 is a flowchart illustrating still another method of data transmission according to an example of the present application. This example is described from a base station side. As shown in FIG. 4, the method of data transmission includes the followings.

At step S401, it is determined that there is service data for which a transmission resource is preempted.

The base station may determine that there is the service data for which the transmission resource is preempted in many ways. For example, if UE may judge that second service data preempts a transmission resource for first service data, it may be determined that there is the service data for which the transmission resource is preempted. For another example, if the UE may detect that second service data preempts a transmission resource for first service data, it may be determined that there is the service data for which the transmission resource is preempted.

At step S402, a transmission of service data is sent to UE, where scheduling control data on the transmission of the service data carries scheduling information of the service data for which the transmission resource is preempted, so that the UE receives the service data for which the transmission resource is preempted according to the scheduling information.

Upon determining that there is service data for which a transmission resource is preempted, the base station may send a transmission of service data to the UE.

In this example, sending the transmission of the service data to the UE may include, but is not limited to, any of the followings.

1) one transmission of first service data is sent to the UE, and scheduling control data on the transmission of the first service data carries scheduling information indicating a transmission resource location of the first service data which is preempted by the second service data and the first service data corresponding to the transmission resource location, so that the UE can receive the first service data corresponding to the transmission resource location according to the scheduling information.

2) A transmission of second service data is sent to the UE, and scheduling control data on the transmission of the second service data carries scheduling information indicating a transmission resource location of the first service data which is preempted by the second service data and scheduling information of first service data corresponding to the transmission resource location, so that the UE can receive the first service data corresponding to the transmission resource location according to the scheduling information.

3) Two transmissions of first service data are sent to the UE, where scheduling control data for the latter transmission of the two transmissions of the first service data carries scheduling information indicating a transmission resource location of the first service data which is preempted by the second service data and the first service data corresponding to the transmission resource location, so that the UE can receive the first service data corresponding to the transmission resource location according to the scheduling information.

The first service data may include, but is not limited to, eMBB data, and the second service data may include, but is not limited to, URLLC data.

In the example, upon determining that there is the service data for which the transmission resource is preempted, the transmission of the service data is sent to the UE, so that the UE can receive the service data for which the transmission resource is preempted according to the scheduling information carried in the scheduling control data on the transmission of the service data.

Figure 5:
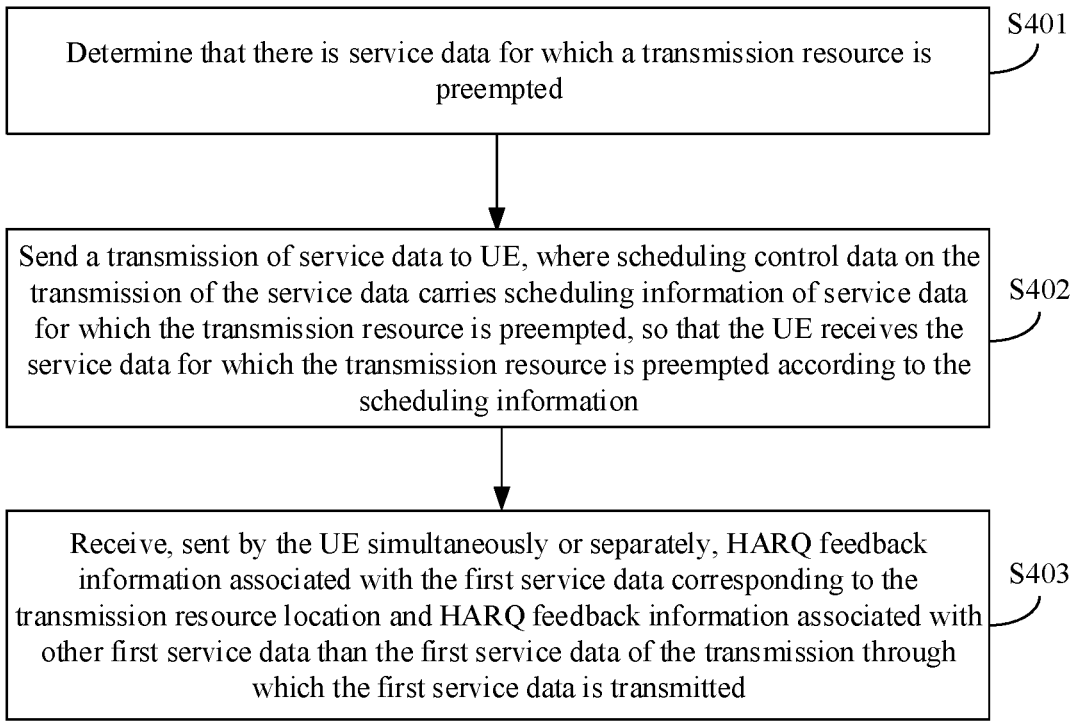
FIG. 5 is a flowchart illustrating yet another method of data transmission according to an example of the present application.

FIG. 5 is a flowchart illustrating yet another method of data transmission according to an example of the present application. As shown in FIG. 5, after step S402, the method of data transmission includes:

at step S403, HARQ feedback information associated with first service data corresponding to transmission resource location and HARQ feedback information associated with other first service data than the first service data of the transmission through which the first service data is transmitted, sent by the UE simultaneously or separately, are received.

In the example, the base station may receive, sent by the UE simultaneously or separately, the HARQ feedback information associated with the first service data corresponding to the transmission resource location and the HARQ feedback information associated with other first service data on the transmission through which the first service data is transmitted. According to pieces of the HARQ feedback information, first service data which fails to be sent can be determined, so that the first service data which fails to be sent can be re-transmitted to the UE.

In the example, the HARQ feedback information associated with the first service data corresponding to the transmission resource location and the HARQ feedback information associated with other first service data on the transmission through which the first service data is transmitted are received, where pieces of the HARQ feedback information are sent by the UE simultaneously or separately. According to the pieces of the HARQ feedback information, first service data which fails to be sent can be determined, thereby providing a condition for retransmission the first service data which fails to be sent.

Figure 6:
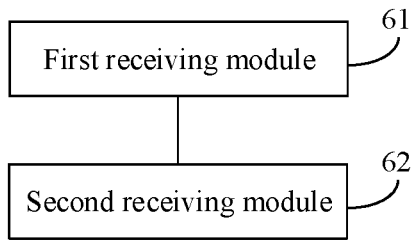
FIG. 6 is a block diagram illustrating an apparatus for data transmission according to an example.

FIG. 6 is a block diagram illustrating an apparatus for data transmission according to an example. As shown in FIG. 6, the apparatus for data transmission includes a first receiving module 61 and a second receiving module 62.

The first receiving module 61 is configured to receive a transmission of service data sent by a base station, where scheduling control data on the transmission of the service data carries scheduling information of service data for which a transmission resource is preempted The first service data may include, but is not limited to, eMBB data, and the second service data may include, but is not limited to, URLLC data.

The second receiving module 62 is configured to receive data for which the transmission resource is preempted according to the scheduling information, which is carried by the scheduling control data on the transmission of the service data received by the first receiving module 61.

Because the scheduling control data carries the scheduling information of the service data for which the transmission resource is preempted, according to the scheduling information, the UE can receive first service data corresponding to the above transmission resource location, e.g., the service data for which the transmission resource is preempted, thereby, realizing the transmission of the service data, such as the eMBB data, for which the transmission resource is preempted.

In the example, the service data for which the transmission resource is preempted is received according to the scheduling information carried in the scheduling control data on the received transmission of the service data, thereby realizing the transmission of the service data for which the transmission resource is preempted.

Figure 7A:
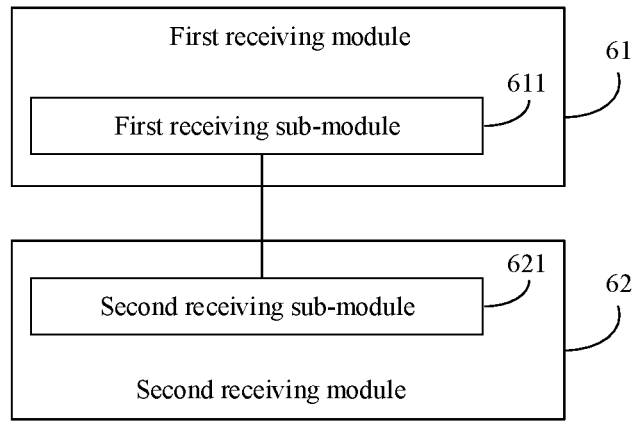
FIG. 7A is a block diagram illustrating another apparatus for data transmission according to an example.

FIG. 7A is a block diagram illustrating another apparatus for data transmission according to an example. As shown in FIG. 7A, based on the example shown in FIG. 6, the first receiving module 61 may include a first receiving sub-module 611.

The first receiving sub-module 611 is configured to receive one transmission of first service data sent by the base station, where scheduling control data on the transmission of the first service data carries scheduling information indicating a transmission resource location of the first service data which is preempted by second service data and the first service data corresponding to the transmission resource location.

The first service data may include, but is not limited to, eMBB data, and the second service data may include, but is not limited to, URLLC data.

For example, when the base station can predict a transmission resource for the eMBB data which is preempted by the URLLC data, scheduling control data on the transmission for the eMBB data may carry scheduling information indicating the transmission resource location of the eMBB data which is preempted by the URLLC data, and the eMBB data corresponding to the transmission resource location. The scheduling control data may be carried on a PDCCH.

The second receiving module 62 may include a second receiving sub-module 621.

The second receiving sub-module 621 is configured to receive the first service data corresponding to the transmission resource location according to the scheduling information.

In this example, the scheduling information indicating the transmission resource location of the first service data which is preempted by the second service data and the first service data corresponding to the transmission resource location carried in the scheduling control data on the transmission of the first service data is received. The first service data corresponding to the transmission resource location is received according to the scheduling information, that is, the service data for which the transmission resource is preempted is received. In this way, the transmission of the service data for which the transmission resource is preempted is realized.

Figure 7B:
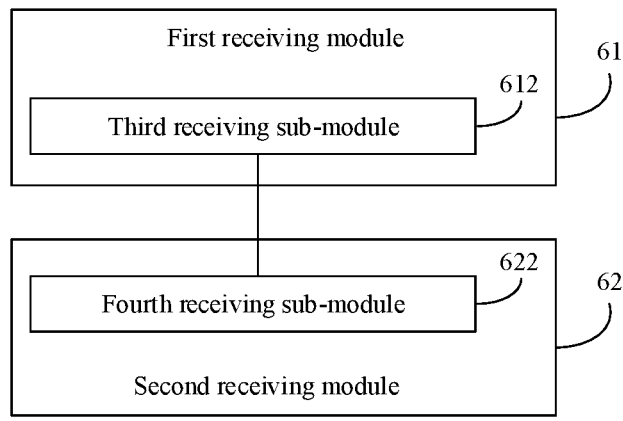
FIG. 7B is a block diagram illustrating another apparatus for data transmission according to an example.

FIG. 7B is a block diagram illustrating another apparatus for data transmission according to an example. As shown in FIG. 7B, based on the example shown in FIG. 6, the first receiving module 61 may include a third receiving sub-module 612.

The third receiving sub-module 612 is configured to receive a transmission of second service data sent by the base station, where scheduling control data on the transmission of the second service data carries scheduling information indicating a transmission resource location of the first service data which is preempted by the second service data and the first service data corresponding to the transmission resource location.

The first service data may include, but is not limited to, eMBB data, and the second service data may include, but is not limited to, URLLC data.

For example, when the base station cannot predict a transmission resource for the eMBB data which is preempted by the URLLC data, that is, a PDCCH associated with the eMBB data does not carry scheduling information indicating the transmission resource location of the eMBB data which is preempted by the URLLC data and the eMBB data corresponding to the transmission resource location, scheduling control data associated with the URLLC data may carry the scheduling information indicating the transmission resource location of the eMBB data which is preempted by the URLLC data and the eMBB data corresponding to the transmission resource location. The scheduling control data associated with the URLLC data may be carried on the PDCCH.

The second receiving module 62 may include a fourth receiving sub-module 622.

The fourth receiving sub-module 622 is configured to receive the first service data corresponding to the transmission resource location according to the scheduling information.

The scheduling information indicating the transmission resource location of the first service data which is preempted by the second service data and the first service data corresponding to the transmission resource location carried in the scheduling control data on the transmission of the second service data is received. The first service data corresponding to the transmission resource location is received according to the scheduling information, that is, the service data for which the transmission resource is preempted is received. In this way, the transmission of the service data for which the transmission resource is preempted is realized.

Figure 7C:
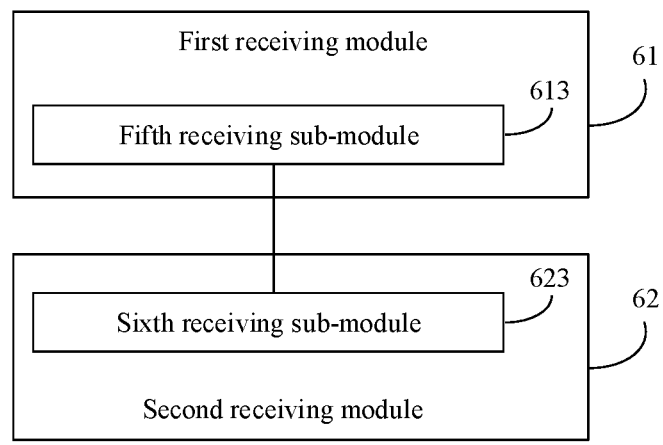
FIG. 7C is a block diagram illustrating another apparatus for data transmission according to an example.

FIG. 7C is a block diagram illustrating another apparatus for data transmission according to an example. As shown in FIG. 7C, based on the example shown in FIG. 6, the first receiving module 61 may include a fifth receiving sub-module 613.

The fifth receiving sub-module 613 is configured to receive two transmissions of first service data sent by the base station, where scheduling control data on the latter transmission of the two transmissions of the first service data carries scheduling information indicating a transmission resource location of the first service data which is preempted by the second service data in the former transmission of the two transmissions of the first service data, and scheduling information of first service data corresponding to the transmission resource location.

The first service data may include, but is not limited to, eMBB data, and the second service data may include, but is not limited to, URLLC data.

For example, when the base station cannot predict a transmission resource for the eMBB data which is preempted by the URLLC data, and while scheduling for the URLLC data is semi-persistent scheduling or grant free (i.e., there is no PDCCH information associated with the URLLC data), two transmissions of the eMBB data may be sent to UE, and scheduling control data on the second time in the two times of the transmission for the eMBB data carries scheduling information indicating a transmission resource location of the eMBB data which is preempted by the URLLC data in the former transmission of the two transmissions of the eMBB data and the eMBB data corresponding to the transmission resource location. The scheduling control data for the latter transmission for the eMBB data may be carried on the PDCCH.

The second receiving module 62 may include a sixth receiving sub-module 623.

The sixth receiving sub-module 623 is configured to receive the first service data corresponding to the transmission resource location according to the scheduling information.

The scheduling information, indicating the transmission resource location of the eMBB data which is preempted by the URLLC data in the former transmission of the two transmissions of the eMBB data and the eMBB data corresponding to the transmission resource location, carried in the scheduling control data on the latter transmission of the two transmissions of the first service data is received. The first service data corresponding to the transmission resource location is received according to the scheduling information, that is, the service data for which the transmission resource is preempted is received. In this way, the transmission of the service data for which the transmission resource is preempted is realized.

Figure 8:
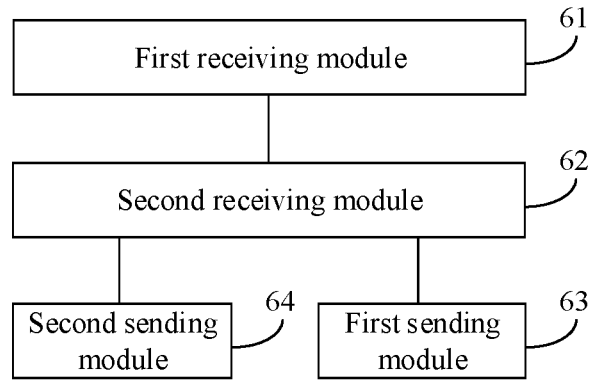
FIG. 8 is a block diagram illustrating another apparatus for data transmission according to an example.

FIG. 8 is a block diagram illustrating another apparatus for data transmission according to an example. As shown in FIG. 8, based on the example shown in FIG. 7A, 7B, or 7C, the apparatus may further include a first sending module 63 or a second sending module 64.

The first sending module 63 is configured to, upon receiving the first service data corresponding to the transmission resource location according to the scheduling information by the second receiving module 62, send simultaneously, to the base station, HARQ feedback information associated with the first service data corresponding to the transmission resource location and HARQ feedback information associated with other first service data than the first service data of the transmission through which the first service data is transmitted.

In this example, a time when the UE receives the first service data corresponding to the transmission resource location is later than a time when the UE receives other first service data in the same transmission of the first service data. After receiving the first service data corresponding to the transmission resource location, the UE may select to send, to the base station simultaneously, the HARQ feedback information associated with first service data corresponding to the transmission resource location and HARQ feedback information associated with other first service data than the first service data of the transmission through which the first service data is transmitted, thereby saving feedback overhead. This method may be applied to HARQ feedback with latency, and also to HARQ feedback without latency.

For example, as for the HARQ feedback without latency, as shown in FIG. 2B, it is assumed that the PDCCH associated with URLLC data carries scheduling information indicating where a transmission resource for eMBB data is preempted, and it is assumed that the scheduling information indicates that the UE receives the eMBB data for which the transmission resource is preempted, i.e., the eMBB data corresponding to CBG 4, on a time domain resource occupied by CBG 5 and on a frequency different from that occupied by CBG5. In this way, when sending HARQ feedback information to the base station, the UE may feed back HARQ feedback information associated with the eMBB data for which the transmission resource is preempted and HARQ feedback information associated with other eMBB data in one eMBB transmission simultaneously.

The second sending module 64 is configured to, upon receiving the first service data corresponding to the transmission resource location according to the scheduling information by the second receiving module 62, send separately, to the base station, the HARQ feedback information associated with the first service data corresponding to the transmission resource location and the HARQ feedback information associated with the other first service data than the first service data of the transmission through which the first service data is transmitted.

In the example, a time when the UE receives the first service data corresponding to the transmission resource location is later than a time when the UE receives other first service data in the same transmission of the first service data. Upon receiving the first service data corresponding to the transmission resource location, the UE may select to send, to the base station separately, the HARQ feedback information associated with first service data corresponding to the transmission resource location and HARQ feedback information associated with other first service data than the first service data of the transmission through which the first service data is transmitted, such that receiving conditions associated with other first service data may be fed back to the base station in time. This method may be applied to HARQ feedback with latency, and also to HARQ feedback without latency.

In the above examples, the HARQ feedback information associated with first service data corresponding to the transmission resource location and the HARQ feedback information associated with other first service data than the first service data of the transmission through which the first service data is transmitted are sent to the base station simultaneously or separately, thereby realizing sending the HARQ feedback information to the base station in various ways.

Figure 9:
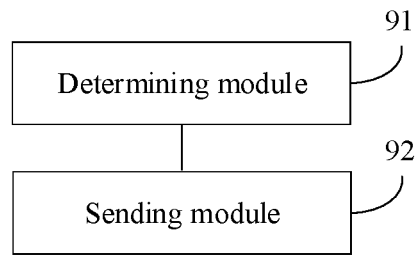
FIG. 9 is a block diagram illustrating still another apparatus for data transmission according to an example.

FIG. 9 is a block diagram illustrating still another apparatus for data transmission according to an example. As shown in FIG. 9, the apparatus for data transmission includes a determining module 91 and a sending module 92.

The determining module 91 is configured to determine that there is service data for which a transmission resource is preempted.

The sending module 92 is configured to, upon determining that there is the service data for which the transmission resource is preempted by the determining module 91, send a transmission of the service data to UE, where scheduling control data on the transmission of the service data carries scheduling information of the service data for which the transmission resource is preempted, so that the UE receives the service data for which the transmission resource is preempted according to the scheduling information.

In the example, upon determining that there is the service data for which the transmission resource is preempted, the transmission of the service data is sent to the UE, so that the UE can receive the service data for which the transmission resource is preempted according to the scheduling information carried in the scheduling control data on the transmission of the service data.

Figure 10A:
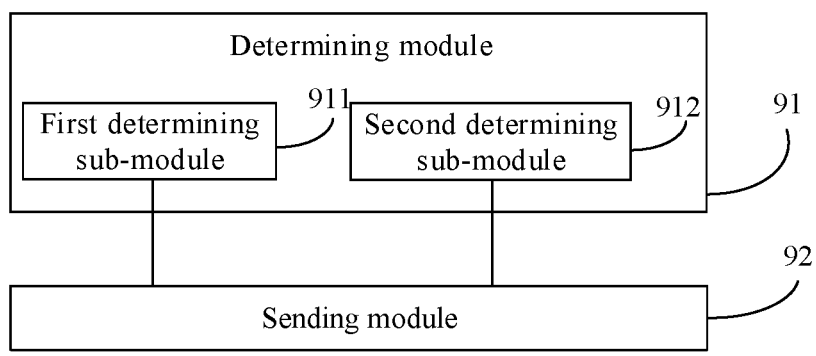
FIG. 10A is a block diagram illustrating yet another apparatus for data transmission according to an example.

FIG. 10A is a block diagram illustrating yet another apparatus for data transmission according to an example. As shown in FIG. 10A, based on the example shown in FIG. 9, the determining module 91 may include a first determining sub-module 911 or a second determining sub-module 912.

The first determining sub-module 911 is configured to judge that second service data preempts a transmission resource for first service data.

The second determining sub-module 912 is configured to detect that the second service data preempts the transmission resource for the first service data.

The base station may determine that there is the service data for which the transmission resource is preempted in many ways. For example, if UE may judge that second service data preempts a transmission resource for first service data, it may be determined that there is the service data for which the transmission resource is preempted. For another example, if the UE may detect that second service data preempts a transmission resource for first service data, it may be determined that there is the service data for which the transmission resource is preempted.

In this example, it may determine that there is the service data for which the transmission resource is preempted in many ways, and the implementation manners thereof are flexible and diverse.

Figure 10B:
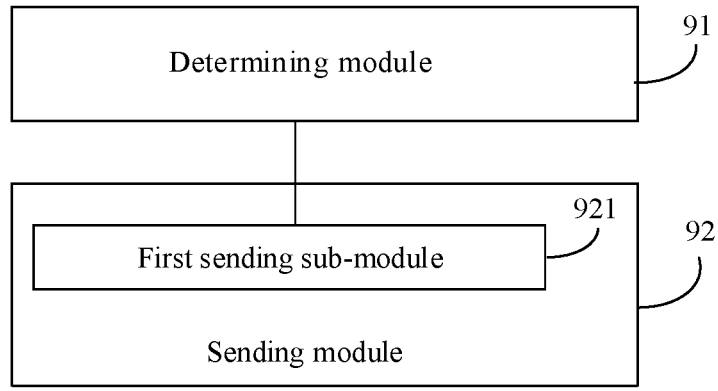
FIG. 10B is a block diagram illustrating yet another apparatus for data transmission according to an example.

FIG. 10B is a block diagram illustrating yet another apparatus for data transmission according to an example. As shown in FIG. 10B, based on the example shown in FIG. 9, the sending module 92 may include a first sending sub-module 921.

The first sending sub-module 921 is configured to send one transmission of first service data to the UE, where scheduling control data on the transmission of the first service data carries scheduling information indicating a transmission resource location of the first service data which is preempted by second service data and the first service data corresponding to the transmission resource location, so that the UE receives the first service data corresponding to the transmission resource location according to the scheduling information.

In this example, one transmission of the first service data is sent to the UE, so that the UE can receive the first service data corresponding to the transmission resource location according to the received scheduling control data, where the scheduling control data on the transmission of the first service data carries the scheduling information indicating the transmission resource location where the second service data preempts the first service data and the scheduling information of first service data corresponding to the transmission resource location. The first service data corresponding to the transmission resource location is the service data for which the transmission resource is preempted. Thus, the transmission of the service data for which the transmission resource is preempted is realized.

Figure 10C:
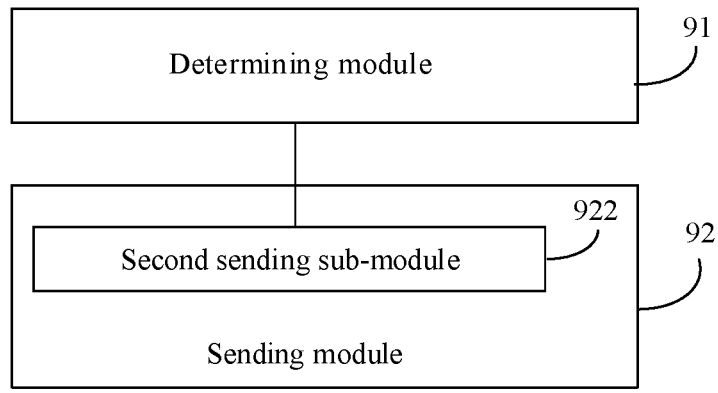
FIG. 10C is a block diagram illustrating yet another apparatus for data transmission according to an example.

FIG. 10C is a block diagram illustrating yet another apparatus for data transmission according to an example. As shown in FIG. 10C, based on the example shown in FIG. 9, the sending module 92 may include a second sending sub-module 922.

The second sending sub-module 922 is configured to send a transmission of second service data to the UE, where scheduling control data on the transmission of the second service data carries scheduling information indicating a transmission resource location of the first service data which is preempted by the second service data and the first service data corresponding to the transmission resource location, so that the UE receives the first service data corresponding to the transmission resource location according to the scheduling information.

In this example, the transmission of the second service data is sent to the UE, so that the UE can receive the first service data corresponding to the transmission resource location according to the scheduling control data, where the scheduling control data on the transmission of the second service data carries the scheduling information indicating the transmission resource location where the second service data preempts the first service data and the scheduling information of first service data corresponding to the transmission resource location. The first service data corresponding to the transmission resource location is the service data for which the transmission resource is preempted. Thus, the transmission of the service data for which the transmission resource is preempted is realized.

Figure 10D:
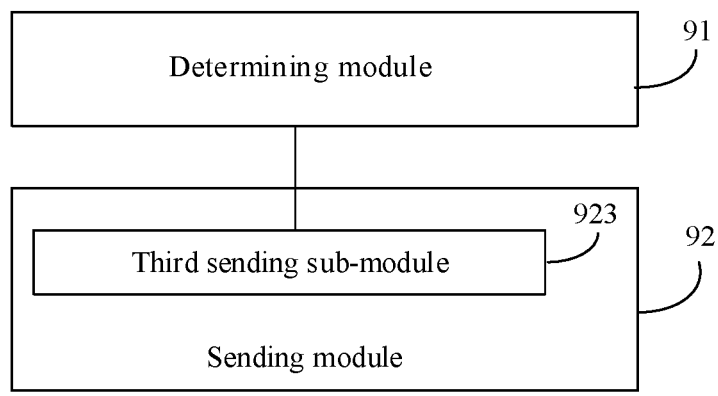
FIG. 10D is a block diagram illustrating yet another apparatus for data transmission according to an example.

FIG. 10D is a block diagram illustrating yet another apparatus for data transmission according to an example. As shown in FIG. 10D, based on the example shown in FIG. 9, the sending module 92 may include a third sending sub-module 923.

The third sending sub-module 923 is configured to send two transmissions of first service data to the UE, where scheduling control data on the latter transmission of the two transmissions of the first service data carries scheduling information indicating a transmission resource location of the first service data which is preempted by the second service data in the former transmission of the two transmissions of the first service data and the first service data corresponding to the transmission resource location, so that the UE receives the first service data corresponding to the transmission resource location according to the scheduling information.

In this example, two transmissions of the first service data are sent to the UE, so that the UE can receive the first service data corresponding to the transmission resource location according to the scheduling control data on the latter transmission of the two transmissions of the first service data, where the scheduling control data carries scheduling information indicating a transmission resource location of the first service data which is preempted by the second service data and the first service data corresponding to the transmission resource location in the former transmission of the two transmissions of the first service data, and the scheduling information of first service data corresponding to the transmission resource location. The first service data corresponding to the transmission resource location is the service data for which the transmission resource is preempted. Thus, the transmission of the service data for which the transmission resource is preempted is realized.

Figure 11:
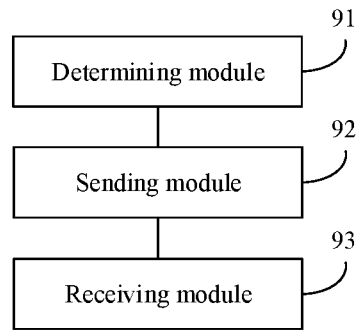
FIG. 11 is a block diagram illustrating yet another apparatus for data transmission according to an example.

FIG. 11 is a block diagram illustrating yet another apparatus for data transmission according to an example. As shown in FIG. 11, based on the example shown in FIG. 10B, 10C, or 10D, the apparatus may further include:

a receiving module 93 is configured to, upon sending transmission of the service data to the UE by the sending module 92, receive HARQ feedback information associated with the first service data corresponding to the transmission resource location and HARQ feedback information associated with other first service data than the first service data of the transmission through which the first service data is transmitted, sent simultaneously or separately by the UE.

In the example, the base station may receive, sent by the UE simultaneously or separately, the HARQ feedback information associated with the first service data corresponding to the transmission resource location and the HARQ feedback information associated with other first service data on the transmission through which the first service data is transmitted. According to pieces of the HARQ feedback information, first service data which fails to be sent can be determined, so that the first service data which fails to be sent can be re-transmitted to the UE.

In the example, the HARQ feedback information associated with the first service data corresponding to the transmission resource location and the HARQ feedback information associated with other first service data on the transmission through which the first service data is transmitted are received, where pieces of the HARQ feedback information are sent by the UE simultaneously or separately. According to the pieces of the HARQ feedback information, first service data which fails to be sent can be determined, thereby providing a condition for retransmission the first service data which fails to be sent.

Figure 12:
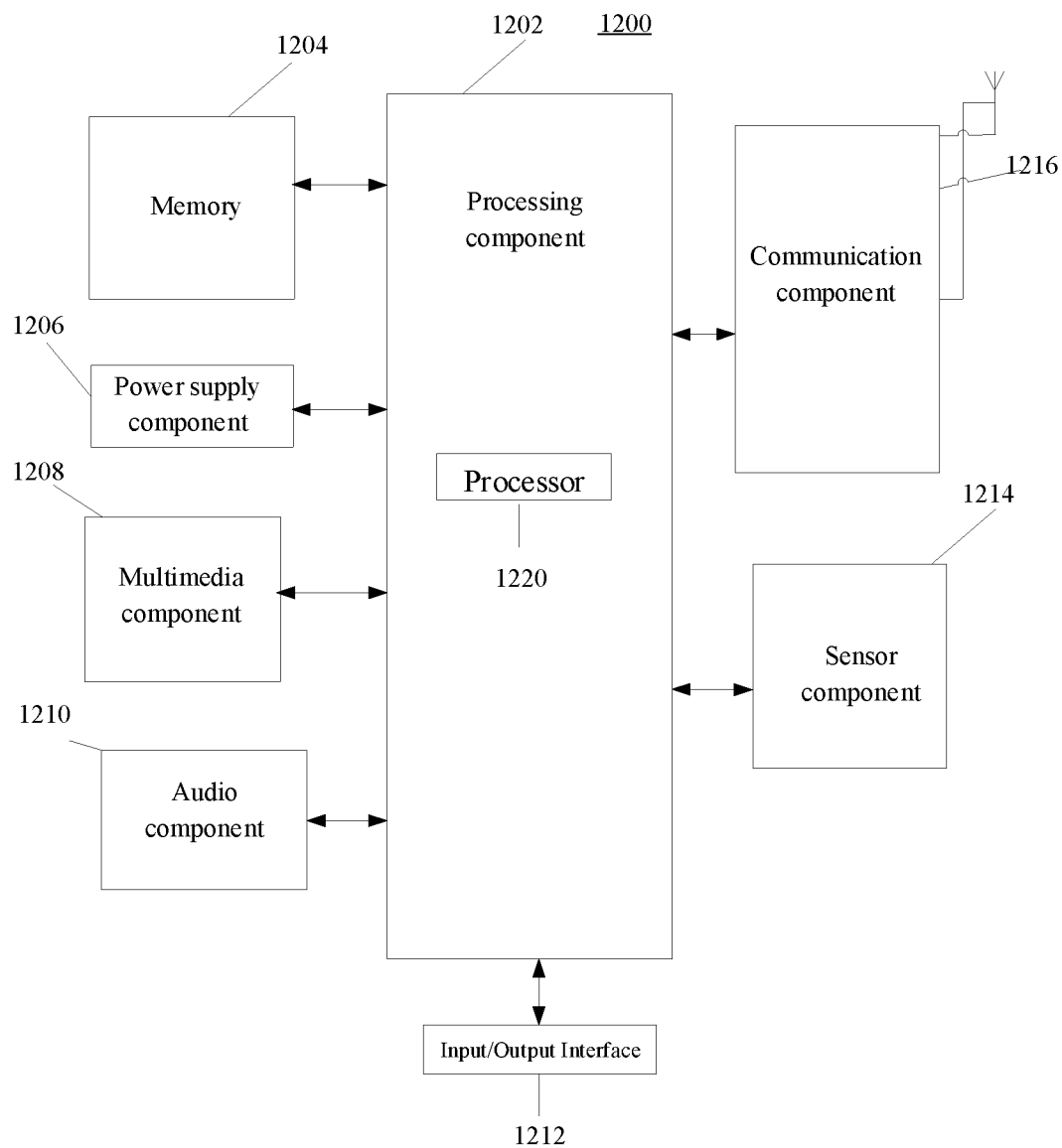
FIG. 12 is a block diagram illustrating an apparatus suitable for data transmission according to an example.

FIG. 12 is a block diagram illustrating an apparatus suitable for data transmission according to an example of the present application. For example, an apparatus 1200 may be UE, such as a mobile phone, a computer, a digital broadcast terminal, a messaging device, a game console, a tablet device, a medical equipment, a fitness equipment, a personal digital assistant, and so on.

Referring to FIG. 12, the apparatus 1200 may include one or more of the following components: a processing component 1202, a memory 1204, a power supply component 1206, a multimedia component 1208, an audio component 1210, an input/output (I/O) interface 1212, a sensor component 1214, and a communication component 1216.

The processing component 1202 generally controls overall operations of the apparatus 1200, such as operations associated with display, phone calls, data communications, camera operations, and recording operations. The processing component 1202 may include one or more processors 1220 to execute instructions to complete all or part of the steps of the above methods. In addition, the processing component 1202 may include one or more modules which facilitate the interaction between the processing component 1202 and other components. For example, the processing component 1202 may include a multimedia module to facilitate the interaction between the multimedia component 1208 and the processing component 1202.

The memory 1204 is to store various types of data to support the operation of the apparatus 1200. Examples of such data include instructions for any application or method operated on the apparatus 1200, contact data, telephone directory data, messages, pictures, videos and so on. The memory 1204 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 1206 supplies power for different components of the apparatus 1200. The power supply component 1206 may include a power supply management system, one or more power supplies, and other components associated with generating, managing and distributing power for the apparatus 1200.

The multimedia component 1208 includes a screen providing an output interface between the apparatus 1200 and a user. In some examples, the screen may include a Liquid Crystal Display (LCD) and a Touch Panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a duration and a pressure associated with the touch or swipe. In some examples, the multimedia component 1208 may include a front camera and/or a rear camera. The front camera and/or rear camera may receive external multimedia data when the apparatus 1200 is in an operating mode, such as a photographing mode or a video mode. Each of the front camera and the rear camera may be a fixed optical lens system or have focal length and optical zooming capability.

The audio component 1210 is to output and/or input an audio signal. For example, the audio component 1210 includes a microphone (MIC). When the apparatus 1200 is in an operating mode, such as a call mode, a record mode and a voice recognition mode, the microphone is to receive an external audio signal. The received audio signal may be further stored in the memory 1204 or sent via the communication component 1216. In some examples, the audio component 1210 further includes a speaker for outputting an audio signal.

The I/O interface 1212 provides an interface between the processing component 1202 and a peripheral interface module. The above peripheral interface module may be a keyboard, a click wheel, buttons, or the like. These buttons may include but not limited to, a home button, a volume button, a start button and a lock button.

The sensor component 1214 includes one or more sensors to provide status assessments of various aspects for the apparatus 1200. For example, the sensor component 1214 may detect the on/off status of the apparatus 1200, and relative positioning of component, for example, the component is a display and a keypad of the apparatus 1200. The sensor component 1214 may also detect a change in position of the apparatus 1200 or a component of the apparatus 1200, a presence or absence of the contact between a user and the apparatus 1200, an orientation or an acceleration/deceleration of the apparatus 1200, and a change in temperature of the apparatus 1200. The sensor component 1214 may include a proximity sensor to detect the presence of a nearby object without any physical contact. The sensor component 1214 may further include an optical sensor, such as a Complementary Metal-Oxide-Semiconductor (CMOS) or Charged Coupled Device (CCD) image sensor which is used in imaging applications. In some examples, the sensor component 1214 may further include an acceleration sensor, a gyroscope sensor, a magnetic sensor, a pressure sensor, or a temperature sensor.

The communication component 1216 is to facilitate wired or wireless communication between the apparatus 1200 and other devices. The apparatus 1200 may access a wireless network based on a communication standard, such as Wi-Fi, 2G or 3G, or a combination thereof. In an example, the communication component 1216 receives a broadcast signal or broadcast related information from an external broadcast management system via a broadcast channel. In an example, the communication component 1216 may further include a Near Field Communication (NFC) module for promoting short-range communication. For example, the NFC module may be implemented based on a Radio Frequency Identification (RFID) technology, an Infrared Data Association (IrDA) technology, an Ultra-Wideband (UWB) technology, a Bluetooth® (BT) technology and other technologies.

In an example, the apparatus 1200 may be implemented by one or more Application Specific Integrated Circuits (ASICs), Digital Signal Processors (DSPs), Digital Signal Processing Devices (DSPDs), programmable Logic Devices (PLDs), Field Programmable Gate Arrays (FPGAs), controllers, microcontrollers, microprocessors, or other electronic components for performing the method described above.

In an example, there is further provided a non-transitory computer-readable storage medium including instructions, such as the memory 1204 including instructions. The above instructions may be executed by the processor 1220 of the apparatus 1200 to complete the above method. For example, the non-transitory computer-readable storage medium may be a Read-Only Memory (ROM), a Random-Access Memory (RAM), a CD-ROM, a magnetic tape, a floppy disk, an optical data storage device, and so on.

Figure 13:
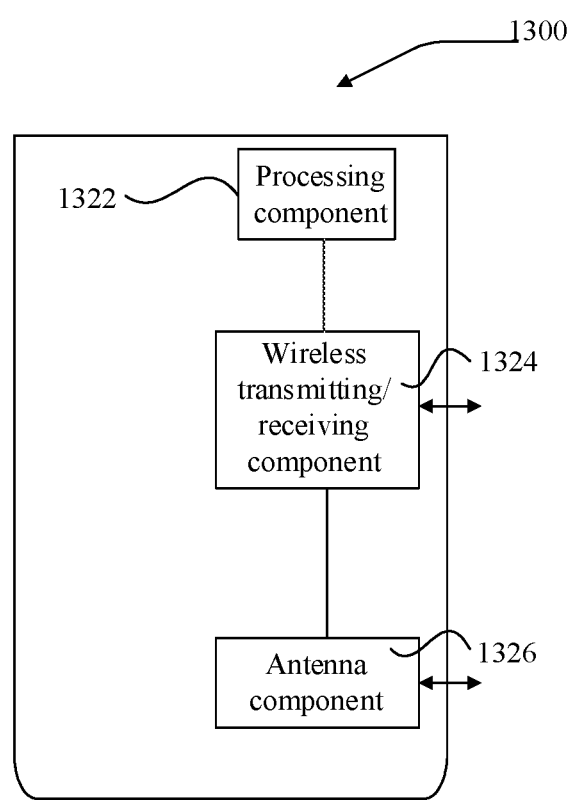
FIG. 13 is a block diagram illustrating another apparatus suitable for data transmission according to an example.

FIG. 13 is a block diagram illustrating another apparatus suitable for data transmission according to an example of the present application. An apparatus 1300 may be provided to a base station. Referring to FIG. 13, the apparatus 1300 includes a processing component 1322, a wireless transmitting/receiving component 1324, an antenna component 1326, and a signal processing portion specific to a wireless interface. The processing component 1322 may further include one or more processors.

One of the processors in the processing component 1322 may be configured to:

determine that there is service data for which a transmission resource is preempted; and send a transmission of the service data to UE, where scheduling control data on the transmission of the service data carries scheduling information of the service data for which the transmission resource is preempted, so that the UE receives the service data for which the transmission resource is preempted according to the scheduling information.

For the apparatus examples, since they basically correspond to the method examples, reference may be made to the partial description of the method examples. The apparatus examples described above are merely illustrative, where the units described as separate components may or may not be physically separated, and the components displayed as units may or may not be physical units, i.e., may be located in one place or may be distributed to multiple network units. Some or all of the modules may be selected according to actual needs to achieve the objectives of the solutions of the examples. Those of ordinary skill in the art can understand and implement the present disclosure without any creative effort.

It should be noted that relational terms such as "first" and "second" herein are used only to distinguish one entity or operation from another entity or operation, and do not necessarily require or imply that these entities or operations have any such actual relationship or order therebetween. Terms "comprising", "including", or any other variation thereof are intended to encompass non-exclusive inclusions, such that a process, method, article, or device including a series of elements includes not only these elements, but also other elements not explicitly listed, or elements inherent to such process, method, article, or device. Without more restrictions, elements defined by the sentence "including a . . . " do not exclude the existence of other identical elements in the process, method, article, or device including the above-described elements.

Other embodiments of the present disclosure will be readily apparent to those skilled in the art after considering the specification and practicing the contents disclosed herein. The present application is intended to cover any variations, uses, or adaptations of the present disclosure, which follow the general principle of the present disclosure and include common knowledge or conventional technical means in the art that are not disclosed in the present disclosure. The specification and examples are to be regarded as illustrative only. The true scope and spirit of the present disclosure are pointed out by the following claims.

It is to be understood that the present disclosure is not limited to the precise structures that have described and shown in the drawings, and various modifications and changes can be made without departing from the scope thereof. The scope of the disclosure is to be limited only by the appended claims.

The invention claimed is:

1. A method of data transmission, comprising:
receiving two transmissions of service data sent by a base station;
receiving scheduling information indicating a transmission resource location of first service data which is preempted by second service data in a former transmission of the two transmissions of the first service data and the first service data corresponding to the transmission resource location, carried in scheduling control data on a latter transmission of the two transmissions of the first service data;
receiving the first service data corresponding to the transmission resource location according to the scheduling information;
sending Hybrid Automatic Repeat reQuest (HARQ) feedback information associated with the first service data corresponding to the transmission resource location and the HARQ feedback information associated with service data other than the first service data of the transmission through which the first service data are transmitted to the base station simultaneously or separately, thereby sending the HARQ feedback information to the base station in multiple ways; and upon that there are service data for which a transmission resource is preempted and the transmission of the service data are sent to user equipment (UE), receiving the service data for which the transmission resource is preempted according to the scheduling information carried in the scheduling control data on the transmission of the service data, thereby realizing multiple ways of determining that there are the service data for which the transmission resource is preempted in multiple ways.

2. A communication system implementing the method according to claim 1, comprising the UE, wherein the UE is configured to implement operations of the method.

3. The communication system according to claim 2, further comprising the base station, wherein the base station is configured to:

send one transmission of the first service data to the UE, to facilitate the UE receiving the first service data corresponding to the transmission resource location according to the received scheduling control data, where the scheduling control data on the transmission of the first service data carries scheduling information indicating a transmission resource location of the first service data which is preempted by the second service data and the first service data corresponding to the transmission resource location, the first service data corresponding to the transmission resource location are the service data for which the transmission resource is preempted; and send another transmission of the second service data the UE, to facilitate the UE receiving the first service data corresponding to the transmission resource location according to the scheduling control data, where the scheduling control data on the transmission of the second service data carries the scheduling information indicating a transmission resource location of the first service data which is preempted by the second service data and the first service data corresponding to the transmission resource location.

4. The communication system according to claim 3, wherein the base station is further configured to:

send two transmissions of the first service data to the UE, to facilitate the UE receiving the first service data corresponding to the transmission resource location according to the scheduling control data on the latter transmission of the two transmissions of the first service data, where the scheduling control data carry the scheduling information indicating a transmission resource location of the first service data which is preempted by the second service data in the former transmission of the two transmissions of the first service data and the first service data corresponding to the transmission resource location;

receive HARQ feedback information associated with the first service data corresponding to the transmission resource location and HARQ feedback information associated with service data other than the first service data of the transmission through which the first service data are transmitted, sent simultaneously or separately by the UE; and determine first service data which are failed to be sent according to the HARQ feedback information, so as to provide a condition for re-transmitting the first service data which are failed to be sent.

5. A method of data transmission, comprising:

determining that there are service data for which a transmission resource is preempted;

sending two transmissions of the service data to User Equipment (UE);

sending, to the UE, scheduling information indicating a transmission resource location of first service data which is preempted by second service data in a former transmission of the two transmissions of the first service data and the first service data corresponding to the transmission resource location, carried in scheduling control data on a latter transmission of the two transmissions of the first service data;

sending the first service data corresponding to the transmission resource location according to the scheduling information;

receiving, from the UE, Hybrid Automatic Repeat reQuest (HARQ) feedback information associated with the first service data corresponding to the transmission resource location and the HARQ feedback information associated with service data other than the first service data of the transmission through which the first service data are transmitted to the base station simultaneously or separately, thereby receiving the HARQ feedback information to the base station in multiple ways; and upon that there are service data for which a transmission resource is preempted, sending the transmission of the service data the UE, such that the UE receives the service data for which the transmission resource is preempted according to the scheduling information carried in the scheduling control data on the transmission of the service data, thereby realizing multiple ways of determining that there are the service data for which the transmission resource is preempted in multiple ways.

6. The method according to claim 5, wherein the determining that there are the service data for which the transmission resource is preempted comprises:

judging that second service data preempts a transmission resource for first service data; or detecting that the second service data preempts the transmission resource for the first service data.

7. User equipment (UE), comprising:

a processor; and a memory for storing instructions executable by the processor, wherein the processor is configured to implement operations including:

receiving two transmissions of service data sent by a base station;

receiving scheduling information indicating a transmission resource location of first service data which is preempted by second service data in a former transmission of the two transmissions of the first service data and the first service data corresponding to the transmission resource location, carried in scheduling control data on a latter transmission of the two transmissions of the first service data;

receiving the first service data corresponding to the transmission resource location according to the scheduling information;

sending Hybrid Automatic Repeat reQuest (HARQ) feedback information associated with the first service data corresponding to the transmission resource location and the HARQ feedback information associated with service data other than the first service data of the transmission through which the first service data are transmitted to the base station simultaneously or separately, thereby sending the HARQ feedback information to the base station in multiple ways; and upon that there are service data for which a transmission resource is preempted and the transmission of the service data is sent to the UE, receiving the service data for which the transmission resource is preempted according to the scheduling information carried in the scheduling control data on the transmission of the service data, thereby realizing multiple ways of determining that there are the service data for which the transmission resource is preempted in multiple ways.

* * * * *